March 21, 1961    J. F. MACURA    2,975,775
BALL TIPPED PUSH ROD
Filed June 13, 1956

J. F. MACURA
INVENTOR.

BY E.C. McRae
J. R. Faulkner
L. H. Oster

ATTORNEYS

United States Patent Office 2,975,775
Patented Mar. 21, 1961

2,975,775
BALL TIPPED PUSH ROD

Joseph F. Macura, Detroit, Mich., assignor to Ford Motor Company, Dearborn, Mich., a corporation of Delaware Filed June 13, 1956, Ser. No. 591,078

6 Claims. (Cl. 123—90)

This invention resides in the field of internal combustion engine and relates specifically to an improvement in the push rods which are employed to transmit mechanical force from the tappets to the rocker arms. This of course forms a portion of the valve train which is employed for opening and closing the poppet valves common to most internal combustion engines.

This invention has been perfected in an effort to remove weight from this valve train without any substantial increase in cost or sacrifice of operating characteristics. Weight saving is vital in the valve train because of the power consumed in the rapid accelerations of the entire train when the engine is operating at high speed.

This invention is most readily understood if it is considered in conjunction with the drawings in which.

Figure 1:
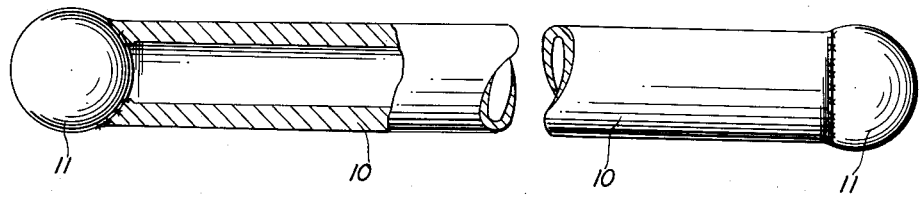
Figure 1 is a drawing partially in section showing a completed push rod.
Figure 2:
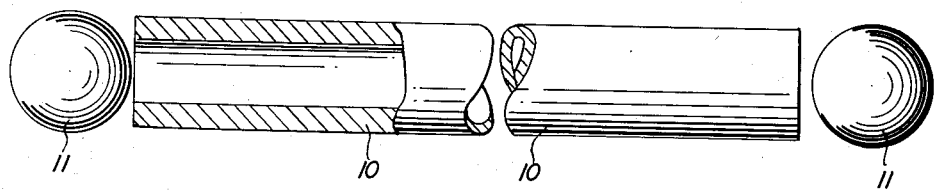
Figure 2 is an exploded view of the push rod showing the relationship of the parts prior to assembly.

Referring to both figures of drawing, body 10 of the push rod is fabricated from hollow stock. While the invention is by no means so limited Bundy tubing may be employed for this body. Bundy tubing is a well known commercial product which is produced by copper plating steel strip, rolling this copper plated strip into a tube and brazing the entire assembly into a unitary article. Conventional seamless tubing has also been successfully employed in this invention.

The tubing destined to become body 10 is cut off with square ends and gripped solidly at one end by a pair of jaws of a resistance welding machine. The other electrode of the resistance welding machine is made hemispherical to accommodate a bearing ball 11. This hemispherical electrode is copper and highly conductive thermally. When the resistance welding machine is operated and a heavy current is caused to flow between bearing ball 11 and body 10, bearing ball 11 upsets body 10 as shown in the drawing and bearing ball 11 is securely welded to body 10. This welding is done very rapidly and because of this speed of welding and the high thermal conductivity of the hemispherical contact with bearing ball 11, the original hardness of bearing ball 11 is not disturbed. It is of course necessary that this hardness be retained to minimize wear on bearing ball 11.

Having secured bearing ball 11 to body 10 the operation is repeated for the other end to produce final structure in the figure drawn.

A typical structure which has been produced successfully and tested involves the use of a steel tubing having a weld thickness of 0.049 inch and an outside diameter of 5/16 of one inch. To each end was applied a hardware grade hardened bearing ball having a diameter of 3/8 of an inch and fabricated from SAE 52100 steel. Such a ball was secured to each end of the body by a resistance welding machine which forced bearing ball 11 against body 10 with a pressure of 450 pounds. When this pressure was established a welding current of 12,000 amperes was caused to flow for 6 cycles to complete the weld. When the flow of current ceased, the mechanical pressure was continued for one second to insure quick cooling. This quick cooling preserves the original hardness of the ball in the areas remote from the weld which of course is the area where wear is localized.

I claim as my invention:

1. A push rod comprising a hollow length of ferrous tubing each end of which is internally upset to define a portion of a spherical surface, and two hardened completely spherical steel bearing balls having a diameter greater than the inside diameter of the ferrous tubing, one of said hardened completely spherical steel bearing balls being secured to each end of said ferrous tubing only by welding together the spherical steel balls and the internally upset portions of the tubing, said welding being conducted without substantially disturbing the hardness of the surface of the steel bearing balls in the areas remote from the weld.

2. A push rod comprising a hollow length of ferrous tubing each end of which is internally upset to define a portion of a spherical surface, and two hardened completely spherical steel bearing balls having a diameter greater than the inside diameter of the ferrous tubing, one of said hardened completely spherical steel bearing balls being secured to each end of said ferrous tubing only by welding together the spherical steel balls and the internally upset portions of the tubing, the surface hardness of the completely spherical steel bearing balls being substantially unimpaired in the areas remote from the weld.

3. A push rod comprising a tube having a generally cylindrical wall having an end portion, a ball having a diameter which is greater than the inner diameter of said tube end, a fused metal connection fastening a first spherical portion of said ball to said tube end, said fused metal connection lying generally on an annulus defined by said tube end, said fused metal connection having radially inner and outer portions displaced from each other in a direction longitudinal of said tube, said fused metal connection having intermediate portions which extend from said inner portion to said outer portion and which slope relative to said longitudinal direction, the wall of said tube being flared outwardly adjacent said fused metal connection, said ball having a second spherical portion lying radially inwardly of said annulus and projecting beyond said fused metal connection toward the tube interior, said ball having a third spherical portion projecting exteriorly of the tube and forming a bearing surface for engagement with a member of a machine in which said push rod is adapted to be used.

4. A push rod comprising a tube having an end, an end piece having a rounded surface, a fused metal connection fastening one portion of said surface to the tube end, said fused metal connection extending in a direction which is generally circumferential of the tube end, said fused metal connection having radially inner and outer portions displaced from each other in a direction longitudinal of said tube, said fused metal connection having intermediate portions which extend from said inner portion to said outer portion and which slope relative to the longitudinal direction of said tube, another portion of said rounded surface extending inwardly of said fused metal connection and generally transversely of the tube interior, said end piece having a portion which projects exteriorly of said tube and which forms a bearing surface for engagement with a member of a machine in which said push rod is adapted to be used.

5. The method of forming a push rod which comprises, providing a tube having an open end portion forming a seat, providing a ball having a diameter greater than the cross dimension of said seat, engaging a first spherical portion of said ball against said seat with a second spherical portion of said ball projecting beyond said seat toward the tube interior and with a third spherical portion of said ball projecting to the exterior of said tube to provide a bearing surface for engagement with a part of a machine, applying force to said tube and ball in a direction for urging them toward each other and while applying said force applying heat to the area of contact of said ball with said seat, said heat and force being sufficient to cause the metal of said tube adjacent said seat to thicken to increase said area of contact and to cause said first spherical portion of said ball and said seat to weld together for fastening said ball to said tube.

6. The method of providing a bearing surface at the tubular end of a push rod which comprises, a forming a seat at said tubular end, engaging against said seat a first spherical portion of a ball having a diameter greater than the cross dimension of said seat with a second spherical portion of said ball projecting longitudinally of said tube beyond said seat toward the tube interior and with a third spherical portion of said ball projecting exteriorly of the tube for engagement with a machine part, applying pressure to the ball and tube end in a direction generally normal to said seat, and while said ball and tube end are subjected to said pressure applying sufficient heat to the juncture of said ball and seat to form a fused metal connection therebetween.

References Cited in the file of this patent

UNITED STATES PATENTS

| | | |
|---|---|---|
| 2,221,934 | Ferris | Nov. 19, 1940 |
| 2,223,730 | Ledig | Dec. 3, 1940 |
| 2,386,317 | Jenny et al. | Oct. 9, 1945 |
| 2,404,241 | MacMillan | July 16, 1946 |
| 2,719,515 | Archangeli | Oct. 4, 1955 |